Figure 1:
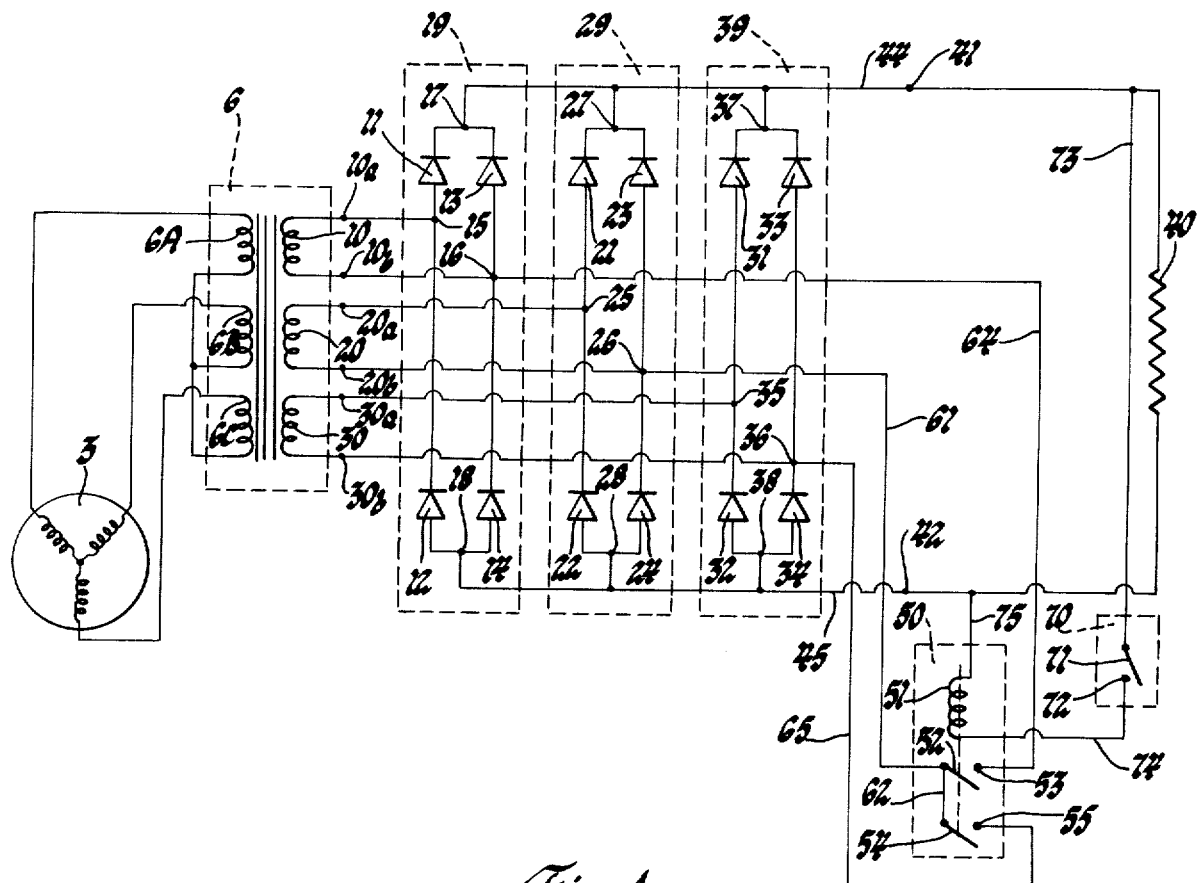

United States Patent [19]

Townsend

[11] 3,932,765

[45] Jan. 13, 1976

[54] POLYPHASE RECTIFIER SYSTEM FOR PROVIDING TWO OUTPUT CURRENT-VOLTAGE RANGES

[75] Inventor: Peter G. Townsend, Rochester, Mich.

[73] Assignee: General Motors Corporation, Detroit, Mich.

[22] Filed: May 1, 1974

[21] Appl. No.: 465,819

[52] U.S. Cl. .................. 307/149; 321/16; 322/29
[51] Int. Cl.² ......................................... H02M 1/08
[58] Field of Search ...... 321/5 R, 5 A, 16; 307/149; 336/5, 12; 322/29, 90, 93, 94

[56] References Cited
UNITED STATES PATENTS
3,378,755  4/1968  Sawyer................................. 322/29

Primary Examiner—Robert K. Schaefer
Assistant Examiner—M. Ginsburg
Attorney, Agent, or Firm—Richard G. Stahr

[57] ABSTRACT

A polyphase rectifier system which provides two output current-voltage ranges upon the system direct current output circuitry. Each phase of a polyphase potential source is rectified by a respective rectifier circuit having the alternating current input circuit thereof electrically connected to the output electrical coil of the corresponding phase of the polyphase potential source and the direct current output circuit thereof connected in parallel with the direct current output circuit of all of the other rectifier circuits. An electrical switching means operable to the electrical circuit open and closed conditions is provided for electrically interconnecting one terminal end of all of the output electrical coils of the polyphase potential source when operated to the electrical circuit closed condition.

5 Claims, 2 Drawing Figures

POLYPHASE RECTIFIER SYSTEM FOR PROVIDING TWO OUTPUT CURRENT-VOLTAGE RANGES

This invention is directed to a polyphase rectifier system for providing two output current-voltage ranges and, more specifically, to a rectifier system of this type employing a simplified switching arrangement.

As is well known and practiced in the electrical power art, more than one current-voltage range is available from a single polyphase source by appropriately interconnecting the phase output windings in a wye or a delta configuration. In the prior art, the transformation of the polyphase output circuit coils from a wye to a delta configuration and vice versa is accomplished by a complex multiple switching arrangement in the main current paths. Therefore, if it is necessary to transform the output circuit coils from one configuration to another under load conditions, switching devices which are capable of interrupting and establishing load current are required. As load break switching devices are expensive, a polyphase rectifier system for providing two output current-voltage ranges with a simplified switching system employing simple switching devices which are not required to interrupt and establish load current is desirable.

It is, therefore, an object of this invention to provide an improved polyphase rectifier system capable of two output current-voltage ranges.

It is another object of this invention to provide an improved polyphase rectifier system having two output current-voltage range capabilities with simplified switching.

In accordance with this invention, a polyphase rectifier system having two output current-voltage ranges is provided wherein each phase of a polyphase alternating current potential source is rectified by a rectifier circuit having the input circuitry thereof connected to the terminal ends of the corresponding output electrical coil and the direct current output circuitry connected in parallel with the direct current output circuitry of the other rectifier circuits in combination with an electrical switching device operable to the electrical circuit open and closed conditions for electrically interconnecting one terminal end of all of the output electrical coils of the source of polyphase potential when operated to the electrical circuit closed condition.

Figure 2:
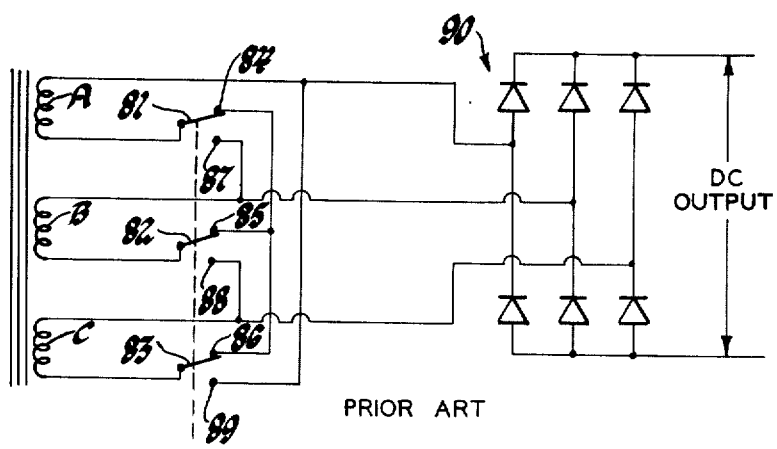

For a better understanding of the present invention, together with additional objects, advantages and features thereof, reference is made to the following description and accompanying drawing in which:

FIG. 1 sets forth the polyphase rectifier system of this invention in schematic form; and FIG. 2 schematically sets forth a prior art switching system in the input circuitry of a three-phase, full-wave bridge rectifier circuit for transformation between wye and delta connections.

FIG. 1 of the drawing sets forth the polyphase rectifier system of this invention for providing two output current-voltage ranges upon the system direct current output circuit. This novel system includes a source of polyphase alternating current voltage of the type having an output electrical coil having two accessible terminal ends corresponding to each phase, a rectifier circuit corresponding to each phase of the source of polyphase alternating current voltage having alternating current input circuitry electrically connected to the terminal ends of the output electrical coil of the phase to which it corresponds and a direct current output circuit and an electrical switching device operable to the electrical circuit open and closed conditions for electrically interconnecting one terminal end of all of the output electrical coils of the source of polyphase alternating current voltage when operated to the electrical circuit closed condition.

The source of polyphase alternating current voltage of the type having an output electrical coil having two accessible terminal ends corresponding to each phase may be a conventional three-phase transformer 6 having three wye connected primary windings 6A, 6B and 6C and three separate output electrical coils 10, 20 and 30. Output electrical coil 10, having two accessible terminal ends 10a and 10b, corresponds to phase A, output electrical coil 20, having two accessible terminal ends 20a and 20b, corresponds to phase B and output electrical coil 30, having two accessible terminal ends 30a and 30b, corresponds to phase C. The primary input windings 6A, 6B and 6C may be supplied by a conventional alternator 3. An alternative configuration would connect an alternator, which has both ends of each output phase winding accessible, directly to the rectifier circuits in like manner to that shown for the illustrated transformer.

Full-wave bridge type rectifier circuit 19 having two positive polarity diodes 11 and 13, two negative polarity diodes 12 and 14, alternating current input circuitry, which may be terminals 15 and 16, and direct current output circuitry which may be terminals 17 and 18 corresponds to phase A of the supply potential; full-wave bridge type rectifier circuit 29 having two positive polarity diodes 21 and 23, two negative polarity diodes 22 and 24, alternating current input circuitry, which may be terminals 25 and 26, and direct current output circuitry which may be terminals 27 and 28 corresponds to phase B of the supply potential and full-wave bridge type rectifier circuit 39 having two positive polarity diodes 31 and 33, two negative polarity diodes 32 and 34, alternating current input circuitry, which may be terminals 35 and 36, and direct current output circuitry, which may be terminals 37 and 38, corresponds to phase C of the supply potential. Although the rectifier circuits 19, 29 and 39 are illustrated in the drawing as being of the full-wave, four diode bridge type, it is to be specifically understood that alternate rectifier circuits may be employed without departing from the spirit of the invention.

The terminal ends 10a and 10b of output electrical coil 10 are connected, respectively, to the alternating current input terminals 15 and 16 of rectifier circuit 19; the terminal ends 20a and 20b of output electrical coil 20 are connected, respectively, to the alternating current input terminals 25 and 26 of rectifier circuit 29 and the terminal ends 30a and 30b of output electrical coil 30 are connected, respectively, to the alternating current input terminals 35 and 36 of rectifier circuit 39.

The direct current output circuit terminals 17 and 18 of rectifier circuit 19, the direct current output terminals 27 and 28 of rectifier circuit 29 and the direct current output terminals 37 and 38 of rectifier circuit 39 are connected in parallel across the system direct current output circuit, which may be terminals 41 and 42 or any other electrical circuit device or arrangement suitable for connection to external circuitry, through respective leads 44 and 45. The external load is illustrated in the drawing as a resistor 40, however, it is to be specifically understood that resistor 40 is representative of any type electrical load which may be connected across a direct current power supply.

The electrical switching device may be a conventional double pole, single throw electrical relay 50 having an operating coil 51, two movable contacts 52 and 54 and two respective corresponding stationary contacts 53 and 55. One terminal end of one of the output electrical coils of the source of polyphase alternating current voltage may be connected to both of the movable contacts 52 and 54 of relay 50 and one terminal end of each of the other two output electrical coils of the source of polyphase alternating current voltage may be connected to a respective one of the stationary contacts 53 and 55 of electrical relay 50. In the drawing, terminal end 20b of output electrical coil 20 is shown to be connected to both movable contacts 52 and 54 of electrical relay 50 through lead 61 and interconnecting lead 62, terminal end 10b of output electrical coil 10 is connected to stationary contacts 53 through lead 64 and terminal end 30b of output electrical coil 30 is connected to stationary contact 55 through lead 65. It is to be specifically udnerstood that the terminal end of any one of the output electrical coils 10, 20 or 30 may be connected to both movable contacts 52 and 54 of relay 50 and the terminal end of each of the other output electrical coils may be connected to a respective one of stationary contacts 53 and 55 without departing from the spirit of the invention.

Alternatively, one terminal end of one of the output electrical coils 10, 20 and 30 may be connected to both stationary contacts 53 and 55 of electrical relay 50 and one terminal end of each of the other two output electrical coils may be connected to a respective one of movable contacts 52 and 54 of the electrical relay 50. This connection is not specifically shown in the drawing as it is obvious to anyone skilled in the electrical circuit art.

It is to be specifically understood that other electrical switching devices, including manually operated switches, may be substituted for relay 50.

With relay 50 in the electrical circuit open condition, as illustrated in FIG. 1 of the drawing, a circuit of three, phase displaced, single phase full-wave bridge type rectifier circuits having their output circuits connected in parallel to the direct current system output circuit is provided. Because of the phase displacements of the inputs, an output current-voltage characteristic very close to that of a standard three-phase delta connection to a full-wave rectifier circuit results.

When it is desired to change the current-voltage range, movable contact 71 of switch 70 may be operated into electrical contact with stationary contact 72 to complete an energizing circuit for operating coil 51 of relay 50 which may be traced from output terminal 41 of the rectifier circuit, through lead 73, switch 70, lead 74, operating coil 51 and lead 75 to terminal 42 of the rectifier circuit. Upon the energization of operating coil 51, electrical relay 50 is operated to the electrical circuit closed condition with movable contacts 52 and 54 in electrical engagement with respective stationary contacts 53 and 55. With electrical relay 50 operated to the electrical circuit closed condition, one terminal end of all of output coils 10, 20 and 30 of the source of polyphase alternating current voltage are electrically interconnected to provide a true wye or star configuration. In this configuration, the source of polyphase alternating current potential is full-wave rectified by a diode bridge type rectifier circuit comprising diodes 11, 21 and 31 in the positive polarity bank and diodes 12, 22 and 32 in the negative polarity bank.

FIG. 2 illustrates the prior art switching arrangement for the transformation from one configuration to another. This transformation requires three gang-operated single pole, double throw switches or, in the alternative, a three pole, double throw relay. With movable contacts 81, 82 and 83 in electrical contact with corresponding stationary contacts 84, 85 and 86, as illustrated in FIG. 2, output electrical coils A, B and C are connected in a wye configuration and with movable contacts 81, 82 and 83 in electrical contact with respective stationary contacts 87, 88 and 89, output electrical coils A, B and C are connected in a delta configuration. It may be noted that with this arrangement, the switching devices are located in the main current paths to full-wave bridge rectifier circuit 90, consequently, these switching devices must be capable of interrupting load current.

The novel system of this invention provides a distinct advantage over that of the prior art illustrated in FIG. 2 in that only a double pole, single throw relay is required and, since the relay contacts switch only the neutral connection of wye connected output electrical coils 10, 20 and 30, they need not be designed to interrupt load current.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A polyphase rectifier system for providing two output current-voltage ranges upon the system direct current output circuit comprising in combination with a source of polyphase alternating current voltage of the type having an output electrical coil having two accessible terminal ends corresponding to each phase; a rectifier circuit corresponding to each phase of said source of polyphase alternating current voltage having alternating current input circuit means electrically connected to said terminal ends of said output electrical coil of the phase to which it corresponds and direct current output circuit means; means for connecting said direct current output circuit means of said rectifier circuits in parallel across said system direct current output circuit; and electrical switching means operable to the electrical circuit open and closed conditions for electrically interconnecting one said terminal end of all of said output electrical coils of said source of polyphase alternating current voltage when operated to the electrical circuit closed condition.

2. A polyphase rectifier system for providing two output current-voltage ranges upon the system direct current output circuit comprising: a source of polyphase alternating current voltage of the type having an output electrical coil having two accessible terminal ends corresponding to each phase; a full wave rectifier circuit corresponding to each phase of said source of polyphase alternating current voltage, each having alternating current input circuit means and direct current output circuit means; means for connecting said two terminal ends of each said output electrical coil of said source of polyphase alternating current voltage to said alternating current input circuit means of the corresponding one of said full wave rectifier circuits; means for connecting said direct current output circuit means of said full wave rectifier circuits in parallel across said system direct current output circuit; and electrical switching means operable to the electrical circuit open and closed conditions for electrically interconnecting one said terminal end of all of said output electrical coils of said source of polyphase alternating current voltage when operated to the electrical circuit closed condition.

3. A polyphase rectifier system for providing two output current-voltage ranges upon the system direct current output circuit comprising: a source of polyphase alternating current voltage of the type having an output electrical coil having two accessible terminal ends corresponding to each phase; a full wave rectifier circuit corresponding to each phase of said source of polyphase alternating current voltage, each having alternating current input circuit means and direct current output circuit means; means for connecting said two terminal ends of each said output electrical coil of said source of polyphase alternating current voltage to said alternating current input circuit means of the corresponding one of said full wave rectifier circuits; means for connecting said direct current output circuit means of said full wave rectifier circuits in parallel across said system direct current output circuit; and an electrical relay having movable and stationary contacts operable to the electrical circuit open and closed conditions for electrically interconnecting one said terminal end of all of said output electrical coils of said source of polyphase alternating current voltage when operated to the electrical circuit closed condition.

4. A three-phase rectifier system for providing two output current-voltage ranges upon the system direct current output circuit comprising: a source of three-phase alternating current voltage of the type having three output electrical coils, each having two accessible terminal ends; a full wave rectifier circuit corresponding to each phase of said source of three-phase alternating current voltage having alternating current input circuit means electrically connected to said terminal ends of said output electrical coil of the phase to which it corresponds and direct current output circuit means; means for connecting said direct current output circuit means of said full wave rectifier circuits in parallel across said system direct current output circuit; an electrical relay having two movable contacts and stationary contact corresponding to each said movable contact; means for connecting one said terminal end of one of said output electrical coils of said source of three-phase alternating current voltage to both of said movable contacts of said electrical relay; and means for connecting one said terminal end of each of said other two output electrical coils of said source of three-phase alternating current voltage to a respective one of said stationary contacts of said electrical relay.

5. A three-phase rectifier system for providing two output current-voltage ranges upon the system direct current output circuit comprising: a source of three-phase alternating current voltage of the type having three output electrical coils, each having two accessible terminal ends; a full wave rectifier circuit corresponding to each phase of said source of three-phase alternating current voltage having an alternating current input circuit means electrically connected to said terminal ends of said output electrical coil of the phase to which it corresponds and a direct current output circuit means; means for connecting said direct current output circuit means of said full wave rectifier circuits in parallel across said system direct current output circuit; an electrical relay having two movable contacts and a stationary contact corresponding to each said movable contact; means for connecting one said terminal end of one of said output electrical coils of said source of three-phase alternating current voltage to both of said stationary contacts of said electrical relay; and means for connecting one said terminal end of each of said other two output electrical coils of said source of three-phase alternating current voltage to a respective one of said movable contacts of said electrical relay.

* * * * *